United States Patent Office.

ADOLPHE ROQUE, OF BRIRE, FRANCE, ASSIGNOR TO JACQUES GUEDIN, OF NEW YORK, N. Y.

Letters Patent No. 60,940, dated January 1, 1867.

---

IMPROVED FIBRE FROM PINE LEAVES FOR HYGIENIC AND OTHER PURPOSES.

---

The Schedule referred to in these Letters Patent and making part of the same.

---

TO ALL WHOM IT MAY CONCERN:

Be it known that I, ADOLPHE ROQUE, of Brire, France, have invented a new and useful improvement in the Manufacture of Wool from Pine Leaves; and I do hereby declare that the following is a full, clear, and exact description thereof, which will enable others skilled in the art to fully understand and make use of the same.

This invention relates to a new mode of producing, from pine leaves, a sort of hygienic wool, capable of replacing, to some extent, common wool or hair in their various applications, and particularly fit to be employed in certain diseases, such as rheumatism, gout, pulmonic afflictions, neuralgia, &c.

In carrying out my invention, I take the leaves of the pine tree (*Pinus sylvestris*) and boil them in a bath of caustic alkaline lye. About a pound of caustic alkaline lye is required to boil a pound of pine leaves, but the same bath can be used several times over, and it is only necessary to add, from time to time, a small quantity of lye, to make up for that which is lost by evaporation. The boiling must be continued for the term of ten or twelve hours, and care must be taken to stir the mass from time to time, so that the pine leaves shall be cooked uniformly. After this time the pine leaves are removed from the caustic lye, and they are washed one or more times in hot water for the purpose of removing therefrom the resinous particles which may still adhere to them. Finally they are passed through cold water, and then dried. After having undergone this simple process, the dry pine leaves present themselves in the form of fine fibrous filaments, which are flexible, tough, elastic, and remarkably aromatic. When united in a mass, these filaments form a sort of felt, similar to that formed by wool or hair, and they can be used, like said other materials, for stuffing mattresses and other articles which require stuffing. My pine-leaf wool can also be woven, and it produces a coarse fabric, eminently fit for dry frictions. In many cases it can neither be replaced by wool nor hair on account of its resinous and aromatic principles, and of its tonic and fortifying nature. It has also the nature to drive out the insects which always develope themselves in wool or hair, and which are many times the germs of various diseases.

I am aware that pine wool has been produced by other means, but to the best of my knowledge no substance has ever been prepared similar to that produced by my process.

What I claim as new, and desire to secure by Letters Patent, is—

The within-described process of producing a hygienic wool from pine leaves, by treating them substantially as specified.

The above specification of my invention signed by me this 21st day of August, 1866.

ADOLPHE ROQUE.

Witnesses:
AMAL, *Médecin Ordinaire de l'Empereur*,
J. FRANK PARGOUD.